(12) United States Patent
Lange et al.

(10) Patent No.: US 11,029,503 B2
(45) Date of Patent: Jun. 8, 2021

(54) OPTICAL SYSTEM MOUNTS

(71) Applicant: Goodrich Corporation, Charlotte, NC (US)

(72) Inventors: Davis Lange, Sturbridge, MA (US); Luke N. Asselin, Amesbury, MA (US); Christopher William Helmke, Bedford, NH (US)

(73) Assignee: Goodrich Corporation, Charlotte, NC (US)

( * ) Notice: Subject to any disclaimer, the term of this patent is extended or adjusted under 35 U.S.C. 154(b) by 342 days.

(21) Appl. No.: 16/137,857

(22) Filed: Sep. 21, 2018

(65) Prior Publication Data

US 2020/0096749 A1 Mar. 26, 2020

(51) Int. Cl.
| | |
|---|---|
| *G02B 5/08* | (2006.01) |
| *G02B 15/02* | (2006.01) |
| *G02B 7/182* | (2021.01) |
| *G02B 26/08* | (2006.01) |
| *G03B 9/08* | (2021.01) |
| *G03B 17/17* | (2021.01) |

(52) U.S. Cl.
CPC ............ *G02B 15/02* (2013.01); *G02B 7/1828* (2013.01); *G02B 26/0816* (2013.01); *G03B 9/08* (2013.01); *G03B 17/17* (2013.01)

(58) Field of Classification Search
CPC .. G02B 15/02; G02B 7/1828; G02B 26/0816; G02B 27/0149; G02B 7/1827; G03B 9/08; G03B 17/17; B64D 47/08
See application file for complete search history.

(56) References Cited

U.S. PATENT DOCUMENTS

| | | | | |
|---|---|---|---|---|
| 4,281,898 | A | * | 8/1981 | Ochiai .................... B60R 1/087 359/606 |
| 4,988,179 | A | * | 1/1991 | Stensland ................ B60R 1/06 359/872 |
| 5,508,772 | A | | 4/1996 | Tanabe |
| 5,907,433 | A | | 5/1999 | Voigt et al. |
| 6,369,702 | B1 | | 4/2002 | Lang |
| 9,880,447 | B2 | | 1/2018 | Ko et al. |
| 2003/0103282 | A1 | | 6/2003 | Schmidt et al. |
| 2004/0079178 | A1 | | 4/2004 | Gorshkov |

FOREIGN PATENT DOCUMENTS

| | | |
|---|---|---|
| CN | 204925596 U | 12/2015 |
| KR | 20110050240 A | 5/2011 |
| WO | 2005116709 A1 | 12/2005 |

OTHER PUBLICATIONS

Extended European search report issued in corresponding EP Application No. 19198916.9, dated Feb. 17, 2020.

* cited by examiner

*Primary Examiner* — Euncha P Cherry
(74) *Attorney, Agent, or Firm* — Locke Lord LLP; Scott D. Wofsy; Georgi Korobanov

(57) ABSTRACT

An optical system mount arrangement includes a stop, a mount for an optical element, and an electromagnet. The mount has a first position and a second position, the mount abutting the stop in the first position and the mount spaced apart from the stop in the second position. The electromagnet is fixed relative to the stop and is arranged to exert a holding force when the mount is in the first position. Optical systems, vehicles carrying optical systems, and methods moving optical elements in optical systems are also described.

16 Claims, 4 Drawing Sheets

OPTICAL SYSTEM MOUNTS

BACKGROUND OF THE INVENTION

1. Field of the Invention

The present disclosure relates to mounts for optical systems, and more particularly movable mounts in optical systems such as for mirrors carried in vehicles.

2. Description of Related Art

Optical systems, such as optical systems carried by aircraft, commonly employ movable elements. Examples of movable elements include shutters, lenses, and mirrors. Movement of such optical elements is generally accomplished by a movement mechanism, which moves the optical element from one position to another position by exerting a movement force on the optical element. Since the optical element is typically held in place by a holding force provided by a mechanical structures like a detent and switch, the movement force is generally sized to overcome the holding force to move the optical element between the positions.

In some optical systems the holding force must be sufficient to overcome force beyond that of holding force due to other forces exerted on the optical system during operation. For example, when the optical system is carried by an aircraft, the holding force can be required to be of sufficient magnitude to prevent movement responsive to acceleration and/or shock from the aircraft environment. Larger holding forces can require larger movement mechanisms to break the hold and move the optical element from one position to another position.

Such conventional methods and systems have generally been considered satisfactory for their intended purpose. However, there is still a need in the art for improved optical element mount arrangements, optical systems with movable optical elements, and methods of moving optical elements between position in optical systems. The present disclosure provides a solution for this need.

SUMMARY OF THE INVENTION

An optical system mount arrangement includes a stop, a mount for an optical element, and an electromagnet. The mount has a first position and a second position, the mount abutting the stop in the first position and the mount spaced apart from the stop in the second position. The electromagnet is fixed relative to the stop and is arranged to exert a holding force when the mount is in the first position.

In certain embodiments a voltage source can be disposed in electrical communication with the electromagnet. The voltage source can be a variable voltage source for tuning holding force generated by the electromagnet. A controller can be operatively connected to the electromagnet to engage and disengage a holding force. The first position can be an upright alignment position. A mirror can be mounted to the mount. The post can be fixed relative to a vehicle, such as an aircraft, the first position can be an upright alignment position, and a mirror can be mounted to the mount.

In accordance with certain embodiments a drive motor can be operably connected to the mount for movement between the first and second positions. The controller can be operatively connected to the drive motor and the electromagnet. The mount can be constructed from a ferromagnetic material. A ferromagnetic insert can be fixed within the mount. The post can be constructed from a non-magnetic material. The electromagnet can be disposed within a pocket defined in the post.

An optical system includes an optical system mount arrangement as described above. The first position is an upright alignment position and a mirror is mounted to the mount. A voltage source is disposed in electrical communication with the electromagnet and the voltage source a variable voltage source for tuning holding force generated by the electromagnet. A drive motor is operably connected to the mount for movement between the first and second positions. A controller is operatively connected to the electromagnet to engage and disengage a holding force. The controller is also operatively connected to the drive motor to move the mount between the first position and the second position.

A method of moving an optical element in an optical system includes, at an optical system mount arrangement as described above, moving the mount to the first position and exerting a holding force on the mount with the electromagnet. In certain embodiments electromagnet can be de-energized and the mount moved from the first position to the second position. The electromagnet can be de-energized prior to moving the mount from the first position to the second position. The holding force can be exerted by the electromagnet after moving the mount to the first position. The holding force can be generated by energizing the electromagnet. The electromagnet can be energized after moving the mount to the first position.

A method of preventing movement of an optical element in an optical system by magnetically attracting a movable mount on which the optical element is fixed toward a stop with magnetic force.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
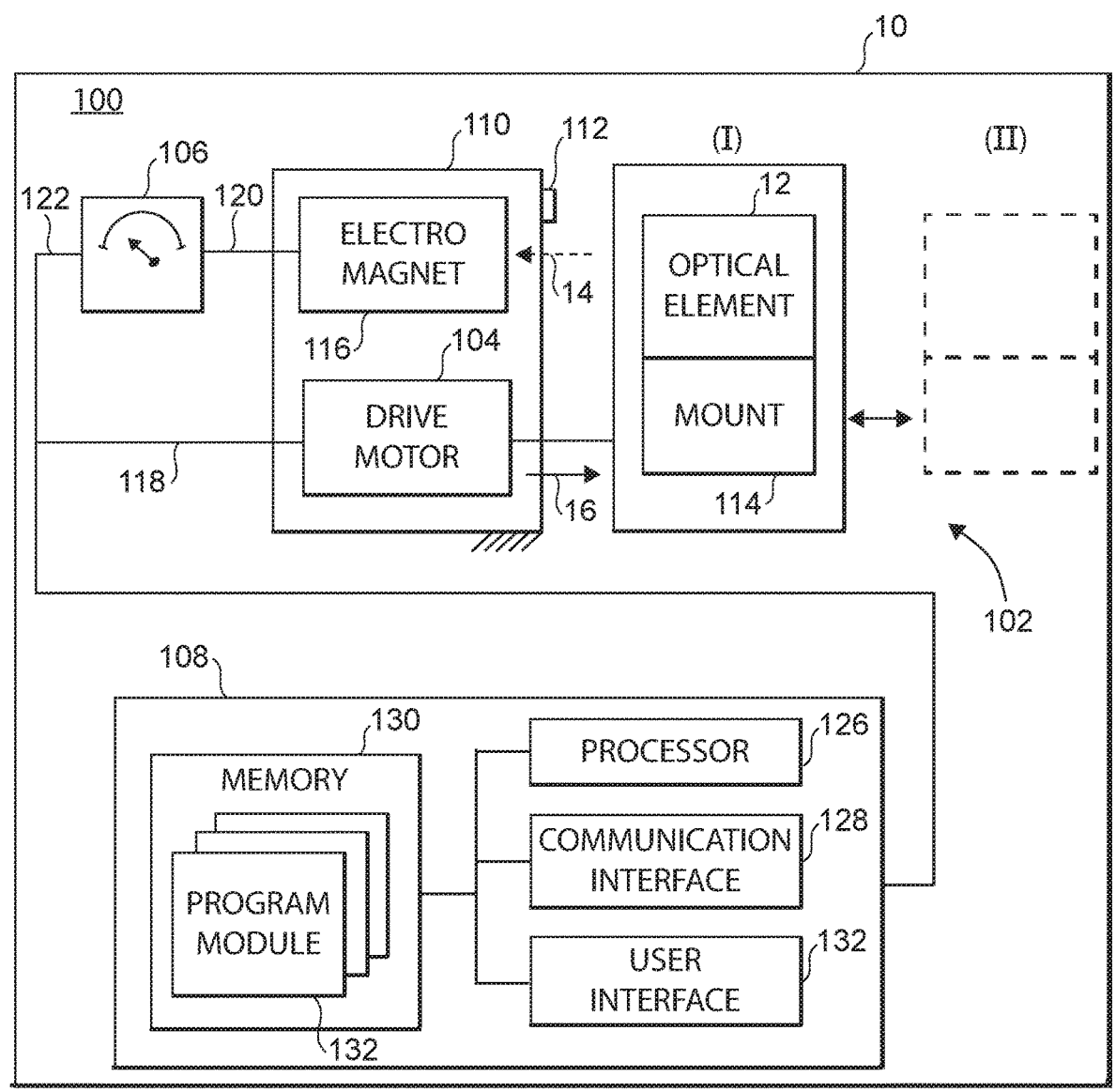
FIG. 1 is a schematic view of an exemplary embodiment of a vehicle carrying an optical system, showing an optical system mount arrangement with a mount movable between a first position and a second position.

Reference will now be made to the drawings wherein like reference numerals identify similar structural features or aspects of the subject disclosure. For purposes of explanation and illustration, and not limitation, a partial view of an exemplary embodiment of an optical system mount arrangement in accordance with the disclosure is shown in FIG. 1 and is designated generally by reference character 100. Other embodiments of optical system mount arrangements, optical systems, vehicles carrying optical systems with optical system mount arrangements, and methods of moving optical elements in optical systems in accordance with the disclosure, or aspects thereof, are provided in FIGS. 2-6, as will be described. The systems and methods described herein can be used in optical systems having movable elements, such as optical systems employing flip-mirrors in aircraft, though the present disclosure is not limited to any specific type of optical element or to optical system in general.

Referring to FIG. 1, a vehicle 10, e.g., an aircraft, is shown. Vehicle 10 carries an optical system 100. Optical system 100 includes an optical system mount arrangement 102, a drive motor 104, a voltage source 106, and a controller 108. Optical system mount arrangement 102 includes a post 110 with a stop 112, a mount 114 for an optical element 12, and an electromagnet 116. Mount 114 has a first position I and a second position II, mount 114 abutting stop 112 in first position I and mount 114 spaced apart from post 110 in second position II. Electromagnet 116 is fixed relative to post 110 and is arranged to exert a holding force 14 when mount 114 is in first position I.

Drive motor 104 is operatively connected to mount 114 for moving mount 114 between first position I and second position II. In this respect drive motor 104 is configured and adapted for exerting a movement force 16 against mount 114 for movement of mount 114 between first position I and second position II. Controller 108 is operatively connected to drive motor 104 for moving mount 114 between first position I and second position II, the operative connection being, for example, via a communication lead 118 or any other suitable communication structure or mechanism.

Voltage source 106 is disposed in electrical communication with electromagnet 116. More particularly voltage source 106 is electrically connected to electromagnet 116 through a electromagnet current lead 120 for applying a flow of holding current to electromagnet 116. Based on the magnitude of the flow of holding current applied to electromagnet 116, which flows through a coil wrapped about a ferromagnetic body, electromagnet 116 generates holding force 14, which attracts mount 114 to post 110 for holding mount 114 in first position I.

Controller 108 is operatively connected to the electromagnet 116 to engage and disengage holding force 14, e.g., by toggling the flow of holding current on and off, the operative connection being, for example, via a voltage source/drive motor communication lead 122 or any other suitable communication structure or mechanism. As will be appreciated by those of skill in the art in view of the present disclosure, removing holding force 14 by ceasing the flow of holding current to electromagnet 116 can reduce the amount of movement force 16 required from drive motor 104 to move mount 114 from first position I, reducing size and weight of optical system mount arrangement 102.

Controller 108 includes a processor 126, a communications interface 128, an optional user interface 134, and a memory 130. Memory 130 includes a non-transitory machine readable medium having a plurality of program modules 132 recorded on it that, when read by processor 126, cause controller 108 to execute certain actions. Among those actions are operations of a method 200 (shown in FIG. 6) of moving an optical element in an optical system, as will be described. It is contemplated that controller 108 can be implemented with software, circuitry, or a combination of circuitry and software, as suitable for an intended purpose.

Figure 2:
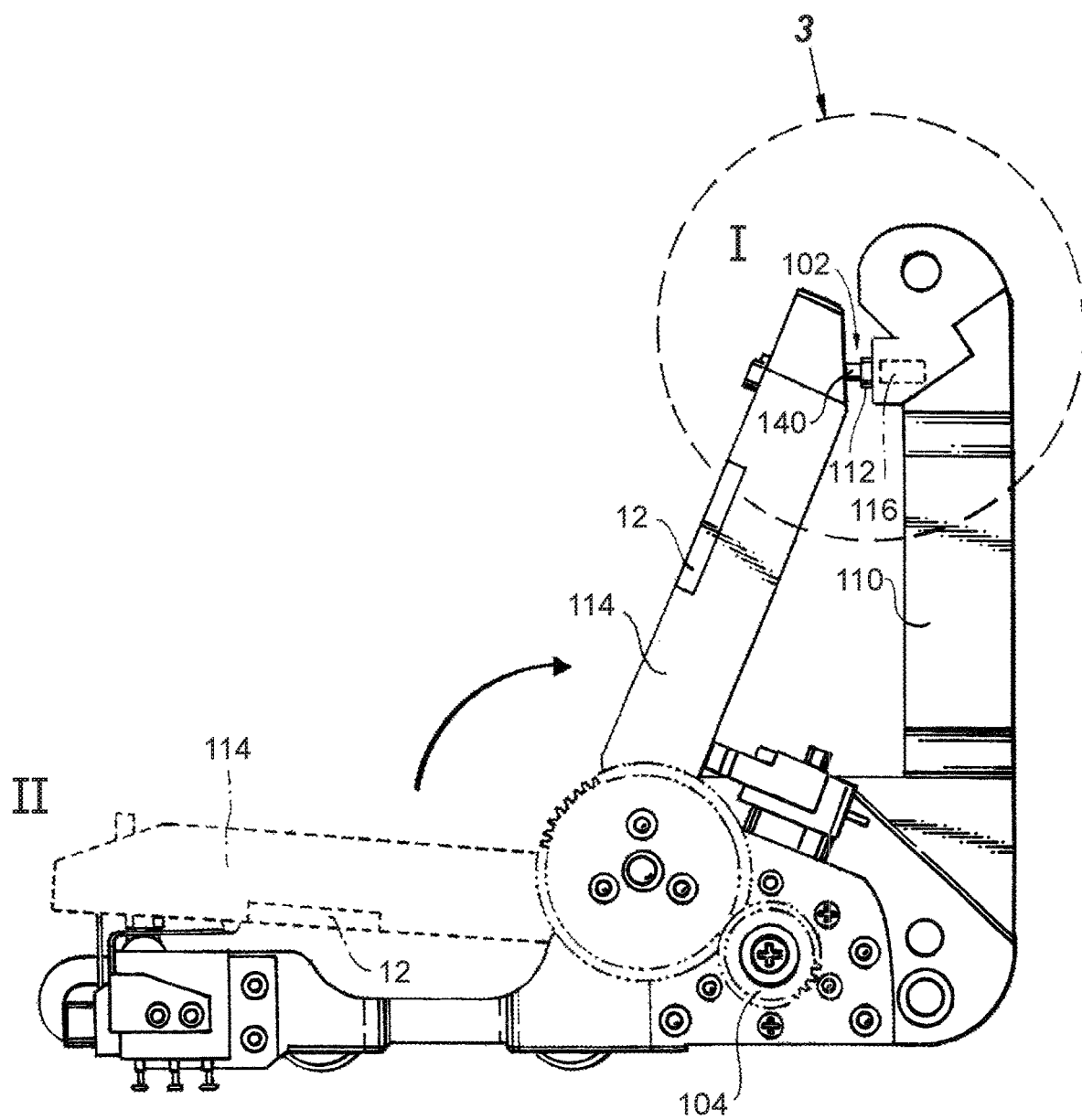
FIG. 2 is side elevation view of the optical system mount arrangement of FIG. 1 according to an exemplary embodiments, showing a mount in the first position and abutting a post.

With reference to FIG. 2, optical system mount arrangement 102 is shown according to an exemplary embodiment. Optical system mount arrangement 102 include post 110 and mount 114. Mount 114 is configured to mount an optical element and as shown in FIG. 2 has a mirror fixed thereto. Mount 114 is pivotably connected to post 110 for movement between first position I and second position II (shown in phantom) relative to post 110. Pivotal movement between first position I and second position II is via operation of drive motor 104. In the illustrated exemplary embodiment first position I is an upright (relative to gravity) alignment position, optical element 12 being a flip-up type mirror which can be inserted and removed from an optical path. This is for illustration purposes only and is non-limiting. As will be appreciated by those of skill in the art in view of the present disclosure, types of movable optical element can be supported by optical system mount arrangement 102 and remain within the scope of the present disclosure.

Figure 3:
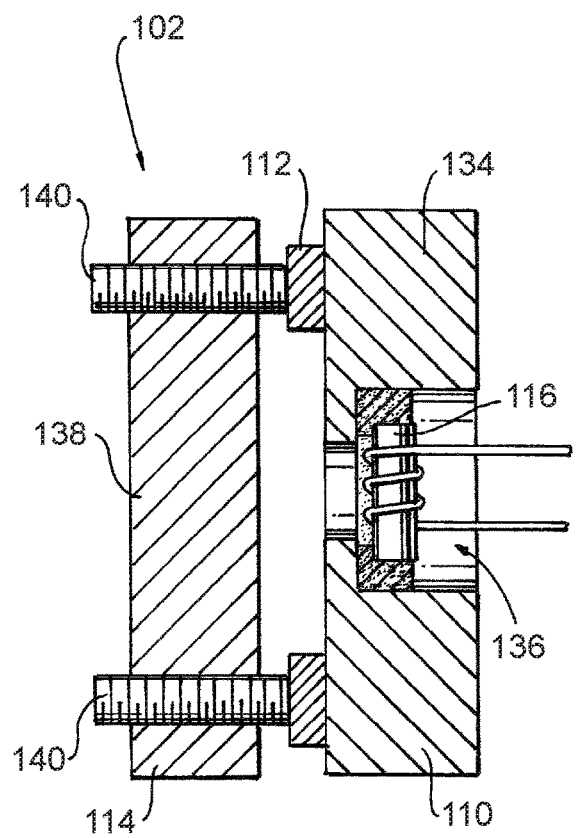
FIG. 3 is schematic view of the optical system mount arrangement of FIG. 1, showing an electromagnet disposed in the post for holding the mount in the first position according to an exemplary embodiment.

With reference to FIG. 3, optical system mount arrangement 102 is shown according to an exemplary embodiment. As shown in FIG. 3, optical system mount arrangement 102 includes a post 110 having electromagnet 116 disposed on or seated within post 110. Post 110 can be constructed from a non-magnetic material 134, such as aluminum or an aluminum alloy. Post 110 defines within its interior a pocket 136, electromagnet 116 seated within pocket 136.

Mount 114 can be formed from a magnetic material 138 such that electromagnet 116 interacts with magnetic material 138 to magnetically hold mount 114 to post 110 in the first position (e.g., as shown in FIGS. 1 and 2). Electromagnet 116 and magnetic material 138 can be configured to have or produce any suitable holding force 14 (shown in FIG. 1) between each other to retain mount 114 in first position I. An adjustable stop 140, e.g., one or more set screws, can be seated in mount 114 adjust distance between magnetic material 138 and electromagnet 116 when in position I, such as a course adjustment for holding force 14 and/or calibrating position of optical element 12 when mount 114 is in first position I.

Figure 4:
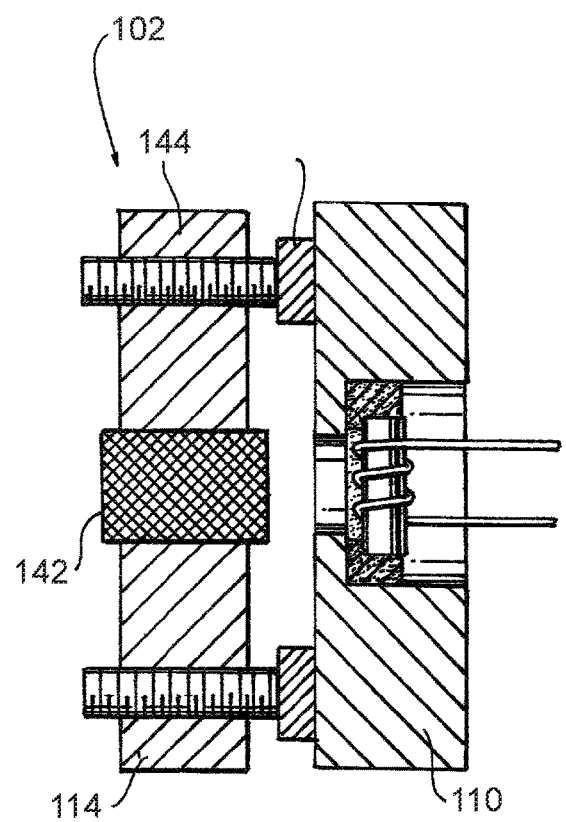
FIG. 4 is schematic view of the optical system mount arrangement of FIG. 1, showing an electromagnet disposed in the post for holding the mount in the first position according to another exemplary embodiment.

Referring now to FIG. 4, optical system mount arrangement 102 is shown according to another exemplary embodiment. As shown in FIG. 4 mount 114 includes a ferromagnetic element 142. For example, ferromagnetic element 142 can be a metallic screw, e.g., as shown in FIG. 4, and can be threaded into mount 114. As will be appreciated by those of skill in the art in view of the present disclosure, use of ferromagnetic element 142 allows mount 114 to be formed from a non-magnetic material 144, such as aluminum or an aluminum alloy, reducing the weight of optical system mount arrangement 102. As will also be appreciated by those of skill in the art in view of the present disclosure, use of a threaded ferromagnetic element 142 allows for coarse adjustment of holding force 14 (shown in FIG. 1) by changing position of ferromagnetic element 142 relative to electromagnet 116 without changing location of mount 114 when in position I.

Optical system mount arrangement 102 can further include one or more adjustable stops (e.g., stops 112) extending from at least one of post 110 or mount 114. The one or more stop can include one or more fixed stops 112 disposed on post 110. The one or more fixed stops 112 can include three or more fixed stop members 112, for example, or any other suitable number.

The one or more stop members can include one or more adjustable stops 140 configured to allow adjustment of the distance between the post 110 and mount 114 in first position I, e.g., to allow alignment of optical element 12 (shown in FIG. 1) and/or to allow adjustment of holding force 14 (shown in FIG. 1) between mount 114 and post 110. The one or more adjustable stops 140 can be disposed on and/or at least partly in mount 114 and can be configured to contact post 110 and/or a stop (e.g., a fixed stop 112) extending from post 110 in first position I. Any other suitable position and/or arrangement for stops 140, 112 is contemplated herein. As shown in FIG. 3, adjustable stop 140 can include a screw threaded to mount 114, for example. The one or more adjustable stops 140 may be made of non-ferrous material, for example, or any other suitable material. The one or more fixed stop 112 can include any suitable material (e.g., hardened steel), ferrous or otherwise.

Figure 5:
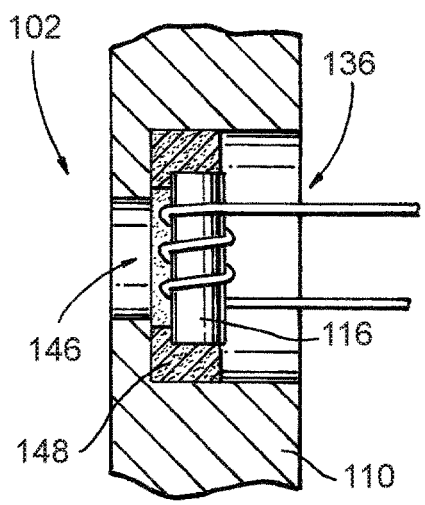
FIG. 5 is schematic view of the optical system mount arrangement of FIG. 1, showing an electromagnet disposed in the post for holding the mount in the first position.

As shown in FIG. 5, electromagnet 116 can be disposed within pocket 136. Pocket 136 can be defined within post 110. Further, post 110 can include an opening 146 defined therethrough to reduce or eliminate magnetic interference of post 110 with electromagnet 116. Electromagnet 116 can be attached to post 110 in any suitable manner. For example, electromagnet 116 can be attached in pocket 136 using an adhesive 148 (e.g., RTV or a silicon adhesive material).

Figure 6:
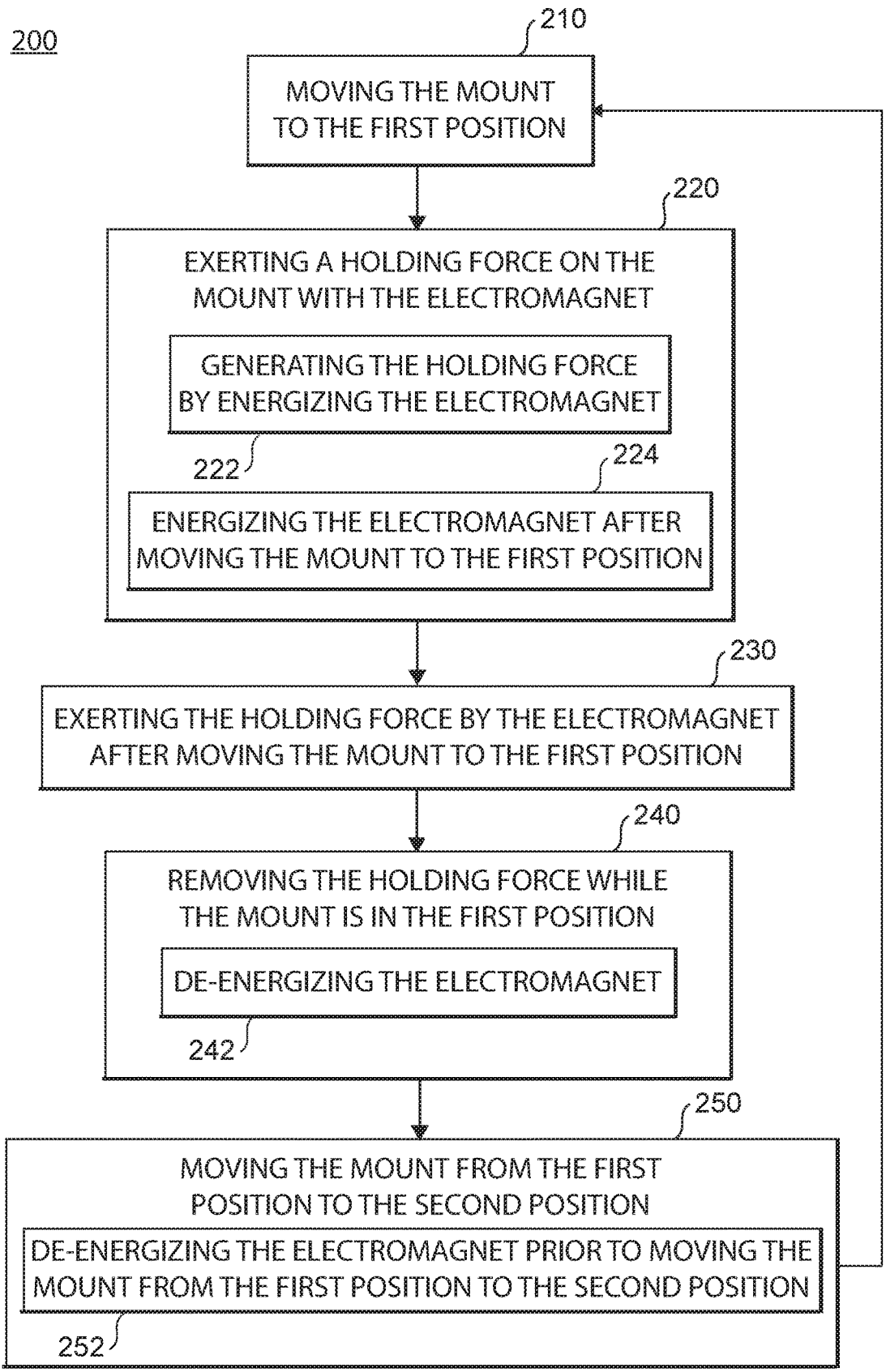
FIG. 6 is a block diagram of a method of moving an optical element in an optical systems, showing steps of the method.

Referring now to FIG. 6, a method 200 of moving an optical element in an optical system, e.g., optical element 12 (shown in FIG. 1) in optical system 100 (shown in FIG. 1), is shown. As shown with box 210, a mount e.g., mount 114 (shown in FIG. 1), is moved to a first position, e.g., position I (shown in FIG. 1). Once positioned a holding force is exerted on mount 114, e.g., holding force 14 (shown in FIG. 1), as shown with box 220. It is contemplated that the holding force can be generated by energizing an electromagnet, e.g., electromagnet 116 (shown in FIG. 1), as shown with box 222. It is also contemplated that the electromagnet can be energized after moving mount 114 to the first position, as shown with box 224.

As shown with box 230, the holding force is exerted by the electromagnet after moving mount 114 to the first position. This allows mount 114 to remain in position and resist forces exerted on mount 114 that tend to displace the mount from the first position, thereby retaining the optical element in the first position. It also allows the holding force to be retained without reliance on a mechanical device, such as a detent and/or switch. Further, the holding force can be retained without the application of power to the drive motor, which is otherwise be necessary to retain mount 114 in position subsequent to movement.

As shown with box 240, once the operational requirements of the system no longer require mount 114 to remain in the first position the holding force is removed from mount 114. This is done by de-energizing the electromagnet, as shown with box 242. Mount 114 is then moved from the first position to the second position, e.g., second position II (shown in FIG. 1), as shown with box 250. Movement from the first position to the second can position can be done, for example, through application of force to the mount by a drive motor, e.g., drive motor 104 (shown in FIG. 1). It is contemplated that the electromagnet be de-energized prior to moving mount 114 from the first position to the second position, as shown with box 252. De-energizing the electromagnet prior to moving mount 114 from the first position to the second position limits the amount of force that the drive motor need generate to move mount 114 from the first position, i.e., to break the hold, allowing for use of a relatively small drive motor and reducing size of the optical system. It also contemplated that method 200 can include preventing movement of an optical element in an optical system by magnetically attracting a movable mount, e.g., mount 114, on which the optical element is fixed toward a stop with magnetic force.

The methods and systems of the present disclosure, as described above and shown in the drawings, provide for optical system mount arrangements with superior properties including the ability to tune the hold force exerted on the mount (and not be captive to an approximated value associated with a mechanical stop), accurately and repeatedly place the mount a same location against a stop rather than a detent, and/or limit the size of the drive motor required to move the mount by limiting the break-hold force generation requirement of the drive motor. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An optical system mount arrangement, comprising:
    a stop;
    a mount for an optical element having a first position and a second position, the mount abutting the stop in the first position, the mount spaced apart from the stop in the second position;
    an electromagnet fixed relative to the stop configured and adapted to exert a holding force when the mount is in the first position;
    a drive motor operatively connected to the mount for movement between the first and second positions; and
    a controller operatively connected to the drive motor and the electromagnet, wherein the controller includes machine readable instructions configured to:
        move the mount to the first position;
        exert a holding force on the mount with the electromagnet in the first position;
        de-energize the electromagnet; and
        move the mount from the first position to the second position,
    wherein the electromagnet is de-energized prior to moving the mount from the first position to the second position.

2. The optical system mount arrangement as recited in claim 1, further comprising a voltage source disposed in electrical communication with the electromagnet.

3. The optical system mount arrangement as recited in claim 2, where the voltage source is a variable voltage source for tuning holding force generated by the electromagnet.

4. The optical system mount arrangement as recited in claim 2, further comprising a controller operatively connected to the electromagnet to engage and disengage a holding force.

5. The optical system mount arrangement as recited in claim 1, wherein the mount is constructed from a ferromagnetic material.

6. The optical system mount arrangement as recited in claim 1, further comprising a ferromagnetic insert fixed within the mount.

7. The optical system mount arrangement as recited in claim 1, wherein the first position is an upright alignment position.

8. The optical system mount arrangement as recited in claim 1, further comprising a post constructed from a non-magnetic material.

9. The optical system mount arrangement as recited in claim 8, wherein the electromagnet is disposed within a pocket defined in the post.

10. A vehicle carrying an optical system mount arrangement as recited in claim 1, wherein the stop is fixed relative to the vehicle, wherein the first position is an upright alignment position, and, and wherein the optical element is a mirror.

11. An optical system, comprising:
   an optical system mount arrangement as recited in claim 1, wherein the first position is an upright alignment position, and further comprising a mirror fixed to the mount;
   a voltage source disposed in electrical communication with the electromagnet, wherein the voltage source is a variable voltage source for tuning holding force generated by the electromagnet;
   a drive motor operably connected to the mount for movement between the first and second positions; and
   a controller operatively connected to the electromagnet to engage and disengage a holding force, the controller operatively connected to the drive motor to move the mount between the first position and the second position.

12. A method a preventing movement of an optical element in an optical system, comprising magnetically attracting a movable mount on which the optical element is fixed toward a stop with magnetic force using a controller, wherein the controller is operatively connected to a drive motor and an electromagnet, wherein the controller includes machine readable instructions configured to:
   move the mount to the first position and exert a holding force on the mount with the electromagnet in the first position.

13. A method of moving an optical element in an optical system, comprising:
   at an optical system mount arrangement including a post with a stop, a mount for an optical element having a first position and a second position, the mount abutting the stop in the first position, the mount spaced apart from the post in the second position, an electromagnet fixed to the post, a drive motor operatively connected to the mount for movement between the first and second positions, and a controller operatively connected to the drive motor and the electromagnet, via the controller;
   moving the mount to the first position;
   exerting a holding force on the mount with the electromagnet;
   de-energizing the electromagnet; and
   moving the mount from the first position to the second position, wherein the electromagnet is de-energized prior to moving the mount from the first position to the second position.

14. The method as recited in claim 13, wherein the holding force is exerted by the electromagnet after moving the mount to the first position.

15. The method as recited in claim 13, wherein the holding force is generated by energizing the electromagnet.

16. The method as recited in claim 15, wherein the electromagnet is energized after moving the mount to the first position.

* * * * *